United States Patent
Allen et al.

(10) Patent No.: US 11,492,498 B2
(45) Date of Patent: Nov. 8, 2022

(54) ISOSORBIDE-BASED DEGASSING AGENT

(71) Applicant: Estron Chemical

(72) Inventors: Fred M. Allen, Paducah, KY (US); Anna Chizhikova, Duck River, TN (US); Robert A. Auerbach, Urbandale, IA (US); Charles David Green, Leesburg, FL (US)

( * ) Notice: Subject to any disclaimer, the term of this patent is extended or adjusted under 35 U.S.C. 154(b) by 175 days.

(21) Appl. No.: 16/526,226

(22) Filed: Jul. 30, 2019

(65) Prior Publication Data

US 2021/0032480 A1    Feb. 4, 2021

(51) Int. Cl.
| | |
|---|---|
| C09D 5/00 | (2006.01) |
| C09D 5/03 | (2006.01) |
| C09D 7/47 | (2018.01) |
| C08K 3/36 | (2006.01) |
| C08K 5/07 | (2006.01) |
| C08K 5/1535 | (2006.01) |
| C08L 91/06 | (2006.01) |

(52) U.S. Cl.
CPC ............ C09D 5/033 (2013.01); C08K 3/36 (2013.01); C08K 5/07 (2013.01); C08K 5/1535 (2013.01); C08L 91/06 (2013.01); C09D 7/47 (2018.01)

(58) Field of Classification Search
None
See application file for complete search history.

(56) References Cited

U.S. PATENT DOCUMENTS

| | | | |
|---|---|---|---|
| 3,345,311 A | 10/1967 | Ehrlich | |
| 5,925,698 A | 7/1999 | Steckel | |
| 6,353,068 B1 | 3/2002 | Dietz | |
| 6,592,994 B2 | 7/2003 | McLeish | |
| 6,811,604 B2 * | 11/2004 | Mentink | C04B 24/02 106/729 |
| 6,825,258 B2 | 11/2004 | Steckel | |
| 7,615,585 B2 | 11/2009 | Gaglani | |
| 8,420,747 B2 | 4/2013 | Malinoski | |
| 9,475,956 B2 | 10/2016 | Beccaria | |
| 2003/0055142 A1 * | 3/2003 | Steckel | C09D 5/03 524/308 |
| 2004/0082679 A1 | 4/2004 | Jahromi | |

(Continued)

FOREIGN PATENT DOCUMENTS

| | | |
|---|---|---|
| EP | 93301762.6 | 9/1997 |
| EP | 99304936.0 | 6/1999 |

(Continued)

OTHER PUBLICATIONS

Yu et al, Simultaneously toughening and reinforcing poly(lactic acid)/thermoplastic polyurethane blend via enhancing interfacial adhesion by hydrophobic silica nanoparticles, polymer testing 45, pp. 107-113 (Year: 2015).*

(Continued)

*Primary Examiner* — Stefanie J Cohen
(74) *Attorney, Agent, or Firm* — Williams Intellectual Property; Benjamin F. Williams

(57) ABSTRACT

A non-toxic isosorbide-based degassing agent producible from biorenewable sources for addition to paints and coatings, powder coatings in particular, to prevent pinholing and minimize yellow discoloration during cure without use of potentially harmful VOCs or predominant proportions of benzoin.

7 Claims, 2 Drawing Sheets

(56) References Cited

U.S. PATENT DOCUMENTS

| | | | | |
|---|---|---|---|---|
| 2005/0222362 A1* | 10/2005 | Hung | ............... | C08G 18/4063 |
| | | | | 528/44 |
| 2010/0037513 A1* | 2/2010 | Petrucci | ............... | C10L 10/12 |
| | | | | 44/301 |
| 2010/0104884 A1* | 4/2010 | Bloom | ............... | C09D 133/06 |
| | | | | 524/109 |
| 2011/0281972 A1 | 11/2011 | Beccaria | | |
| 2015/0126599 A1* | 5/2015 | Sanborn | ............... | C07D 493/04 |
| | | | | 514/470 |
| 2017/0355672 A1 | 12/2017 | Koning | | |

FOREIGN PATENT DOCUMENTS

| | | | |
|---|---|---|---|
| EP | 12154626.1 | | 5/2012 |
| EP | 3467001 A1 | | 10/2019 |
| KR | 1020180130045 A1 | | 10/2018 |
| KR | 20180130045 A | * | 12/2018 |
| RO | 123220 B1 | | 5/2006 |
| WO | 99/63014 | | 12/1999 |

OTHER PUBLICATIONS

KR-20180130045-A—English translation Dec. 2018 (Year: 2018).*
Si et al, Poly(lactic acid)/biobased polyurethane blends with balanced mechanical strength and toughness, polymer testing 69, pp. 9-15, May 2018 (Year: 2018).*
Plastics Today Staff, Corn-based isosorbide could serve as BPA replacement (Year: 2010).*
https://www.plasticstoday.com/content/corn-based-isosorbide-could-serve-bpa-replacement/24854447815124.
Susan L. Bell, Process Economics Program, Report 265A Bio-Based Polymers, published Aug. 2013, available at: https://ihsmarkit.com/pdf/RP265A_toc_173866110917062932.pdf.
(Li, S et al.) Thermoplastic Polyurethanes Stemming from Castor Oil: Green Synthesis and Their Application in Wood bonding. Coatings 2017, 7, 159; doi: 10.3390/coatings7100159. p. 2, Second paragraph; p. 7, second paragraph.
(Estron Chemical) Oxymelt A2 and MSDS. Apr. 10, 2015. Retreived from https://web.archive.org/web/20150410083124/http://www.estron.com/products/oxymelt-2. p. 2, section 3.

* cited by examiner

ISOSORBIDE-BASED DEGASSING AGENT

TO ALL WHOM IT MAY CONCERN

Be it known that we, Fred M. Allen, Ph.D, Anna Chizhikova, Charles David Green, and Robert A. Auerbach, Ph.D. citizens of the United States, have invented new and useful improvements in an isosorbide-based degassing agent as described in this specification.

BACKGROUND OF THE INVENTION

Various types of degassing agents used in paints and coatings, and powder coatings in particular, are known in the art. Most degassing agents current in the art employ high concentrations of the hydroxy ketone, benzoin. Benzoin is effective in the prevention of the formation of "pinholing" from out-gassing of powder coatings during cure, but it has a tendency to yellow with heat and over time. This renders benzoin less than ideal; paints and coatings are often used to impart a desired color or characteristic to a surface, or to preserve the appearance of a surface, which yellowing taints. Thus, much effort has been employed in developing improved degassing agents for powder coatings.

Ideally, a degassing agent is readily addable to existing powder coating compositions to provide the requisite surface tension and/or other physical effects that prevent pinholing while at the same time remaining invisible without volatizing from the paint or coating. Several alternate agents, that may contain bisphenol A ("BPA") as a component, for example, or other Volatile Organic Compounds ("VOCs"), present volatility issues potentially associated with health hazards. Thus, what is needed is a stable agent readily combinable to powder coatings that does not signal a color change over time or conditions and is non-toxic and less volatile.

U.S. Pat. No. 9,475,956, to Beccaria et al. discloses powder coating compositions for low temperature curing and high flow. Beccaria et al. rely on a composition having a polyester resin, of 0.1 to 60 weight percent of mono- or poly-functional saturated or unsaturated fatty acids; 30 to 60 weight percent of an aromatic diacid or cycloalkyl diacids or anhydride; 20 to 30 weight percent of aliphatic diol; 0 to 6 weight percent of aliphatic triol; and 0 to 10 weight percent of isosorbide; along with additional isomers, with a total weight percent of the monomers equal to 100. Beccaria et al. thus reduce yellowing caused by benzoin at high concentrations but fail to address volatilization concerns by incorporating additional as well as potentially toxic aliphatic organic compounds.

U.S. Pat. No. 7,615,585 to Gaglani et al. also seeks to provide a degassing composition for curable coatings that does not yellow over time nor when exposed to heat. Gaglani et al. disclose a plurality of unfused aromatic rings and at least one functional group selected from ketals, carbamates, carbonates and carboxylic acid ester, and the products of benzoin reacted with a diol, a polyol, an isocyanate, a haloformate, a dicarboxylic acid, or an acid anhydride. Gaglani et al. teach composition with various organic waxes, however, Gaglani et al. rely on compositions of organic compounds that are diverse and wide ranging, are predominantly volatile and potentially toxic, and are thus less than ideal for inclusion in paints and coatings used in households.

U.S. Pat. No. 6,825,258, to Steckel, teaches a powder coating additive composition containing a non-crosslinked product made by the reaction of an organic alcohol and a carboxylic acid, or a reactive equivalent to a carboxylic acid, the product containing at least one hydrocarbyl group of between 10 to 100 carbon atoms and a fluoropolymer. Steckel discloses isosorbide, but as a precursor to sorbitan ester variants used in combination with additional compounds, including benzoin as a deaerating agent.

Applicant's composition of matter presents useful improvements over these and other degassing agents and curatives by presenting a readily available compound derived from biorenewable starch in combination with naturally occurring castor oil.

FIELD OF THE INVENTION

The present invention relates to a non-toxic isosorbide-based degassing agent that minimizes or excludes use of benzoin to prevent yellowing over time and when exposed to heat.

SUMMARY OF THE INVENTION

The present isosorbide-based degassing agent has been devised as an additive for degassing when curing paints and coatings without the need of a predominance of benzoin. Benzoin has a tendency to yellow, either with heat or ageing.

Isosorbide ($C_6H_{10}O_4$) is a heterocyclic diol comprising two fused furan rings produced by the hydrolysis of starch. Hydrogenation of glucose, a simple sugar, gives sorbitol. Acid-catalyzed dehydration of D-sorbitol yields monocyclic furanoid sorbitan. Further dehydration thence yields isosorbide.

Thus, isosorbide is readily producible at quantity from readily available, biorenewable precursors. Isosorbide is produced as a white, crystalline, hydrophilic solid, typically in powdered form. It is highly soluble in polarized liquids, such as water, alcohol and ketones. While appropriate for powdered coatings, isosorbide nonetheless readily enters solution in available liquid paints and coatings at low energy (>850 g/L at 25° C.).

The present isosorbide-based degassing agent, therefore, includes a proportion of isosorbide, from 1 to 100 weight percent. Another embodiment of the invention contemplates addition of vegetable oils and/or waxes in combination with the isosorbide, such as castor oil, coconut oil, soybean oil, tall oil, olive oil, canola oil, and other triglycerides and naturally derived oil polyols, and/or waxes such as castor wax, beeswax, and polyolefin, for example. A preferred embodiment contemplates castor oil in combination with isosorbide for use in powdered coatings and rendered in a solid, waxy form.

Castor oil is a vegetable oil pressed from castor beans comprising 85-95% ricinoleic acid, 2-6% oleic acid, 1-5% linoleic acid, 0.5-1% ∝-linolenic acid, 0.5-1% stearic acid, 0.5-1% palmitic acid, 0.3-0.5% dihydroxystearic acid, and approximately 0.2-0.5% other fatty acids, on the average. Castor oil, a polyol, acts as a film forming resin, increasing surface tension and maintaining congruence of the surface as degassing occurs. The preferred embodiment of the present isosorbide-based degassing agent, therefore, includes a proportion of castor oil (CASRN 8001-79-4), or the hydrogenated form that is castor wax (CASRN 8001-78-3), from 0 to 80 weight percent. Additional and other oils and/or waxes derived from natural and plant sources are contemplated within scope of the invention.

A proportion of silicon dioxide, also known as silica, or other high surface area inorganic powder, may be included to make the mixture with other components a free-flowing powder. The preferred embodiment of the present composition therefore includes 0 to 5 weight percent silica. Other porous, inorganic powders are contemplated in scope of the invention. In some embodiments, 0 to 5 weight percent benzoin may be included, but at a lesser proportion than typically employed in the art whereby the appearance of yellowing over time is minimized or prevented. The range of weight percent of benzoin includes 0 weight percent, so addition of benzoin is not necessarily required when practicing the instant invention as contemplated herein.

The present composition is contemplated for preferred use as a powder additive to powder coatings such as triglycidylisocyanurate ("TGIC"), epoxy/polyester hybrids, Epoxies, and hydroxyalklamide ("HAA") polyester chemistry, at a recommended level of 0.3 to 4.0% of the total formulation, with a preferred loading of up to 1 weight percent. The present composition therefore is readily mixable with coatings to prevent pinholing and other defects formed during curing, as a potent degassing agent that is available as a biorenewable, non-toxic and non-yellowing alternative to higher concentrations of benzoin.

Thus has been broadly outlined the more important features of the present isosorbide-based degassing agent so that the detailed description thereof that follows may be better understood and in order that the present contribution to the art may be better appreciated.

Objects of the present isosorbide-based degassing agent, along with various novel features that characterize the invention are particularly pointed out in the claims forming a part of this disclosure. For better understanding of the isosorbide-based degassing agent, its operating advantages and specific objects attained by its uses, refer to the accompanying drawings and description.

DETAILED DESCRIPTION OF THE DRAWINGS

Table 1, below, presents the composition of a preferred embodiment of the instant invention known by the trade name "Oxymelt A-8":

TABLE 1

| Raw Material Name | Chemical Name | CASRN | Supplier |
| --- | --- | --- | --- |
| Polysorb PBA, PB, P; Novosorb P | 1,4,3,6-Diarhydro-D-gluciol | 662-67-5 | Roquette Frères; Novaphene Specialties Pvt Ltd |
| Castor Wax | Hydrogenated Castor Oil | 8001-78-3 | Nexeo |

TABLE 1-continued

| Raw Material Name | Chemical Name | CASRN | Supplier |
| --- | --- | --- | --- |
| Supernat 22 or other precipitated silicas | Silicon Dioxide | 112928-00-8 | Evonik |
| Benzoin | 2-Hydroxy-1,2-Diphenyl Ethanone | 119-53-9 | Miwon |

Chemical formulations of the various degassing agents used in the instant experiments are provided in Table 2 below:

TABLE 2

| Degassing Additive Name | Recommended Loading | Suppliers |
| --- | --- | --- |
| Benzoin (2-Hydroxy-1,2-Diphenyl Ethanone) | 0.3-1.5% | Miwon |
| Powdermate 542 DG (Amide Modified Phenolated Urea Surfactant) | 0.5-2.0% | Troy Co. |
| Crayvallac PC (Micronized Hydrogenated Castor Oil) | 0.5-2.0% | Arkema |
| Oxymelt A-4 (Bisphenol A and Epoxy) | 0.5-4.0% | Estron |
| Oxymelt A-8 (Isosorbide-Castor Wax-Silica-Benzoin Mixture) | 0.3-1.5% | Estron |

Figure 3:
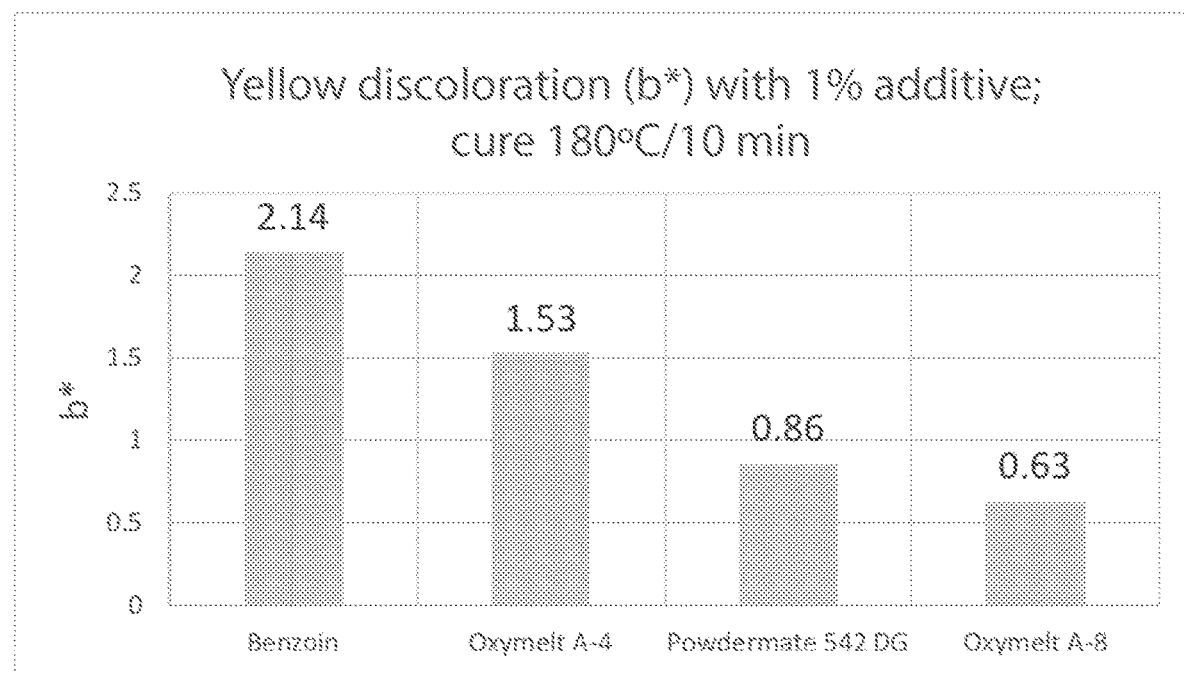
FIG. 3 is a block chart showing the color change (yellowing) index at 180° C. over 10 minutes for various degassing agents compared to Oxymelt A-8.

In generating the results depicted herein, each degassing agent tested was admixed to standard, white β-hydroxylalkyl amide ("HAA") polyester powder coating at 0.5 weight percent of total formulation (FIG. 1) and at 1 weight percent for yellow color change measurement (FIG. 3). An example powder coating formulation is set forth in Table 3 below.

TABLE 3

| P865 polyester (DSM) | 68.4% |
| --- | --- |
| Primid XL-552 HAA curing agent (EMS-Griltech) | 3.6% |
| Resiflow PL-200 flow control additive (Estron) | 1% |
| Degassing Agent | 0.5-1% |
| Titanium Dioxide filler (Chemours, Kronos) | 26-25.5-% |

Figure 1:
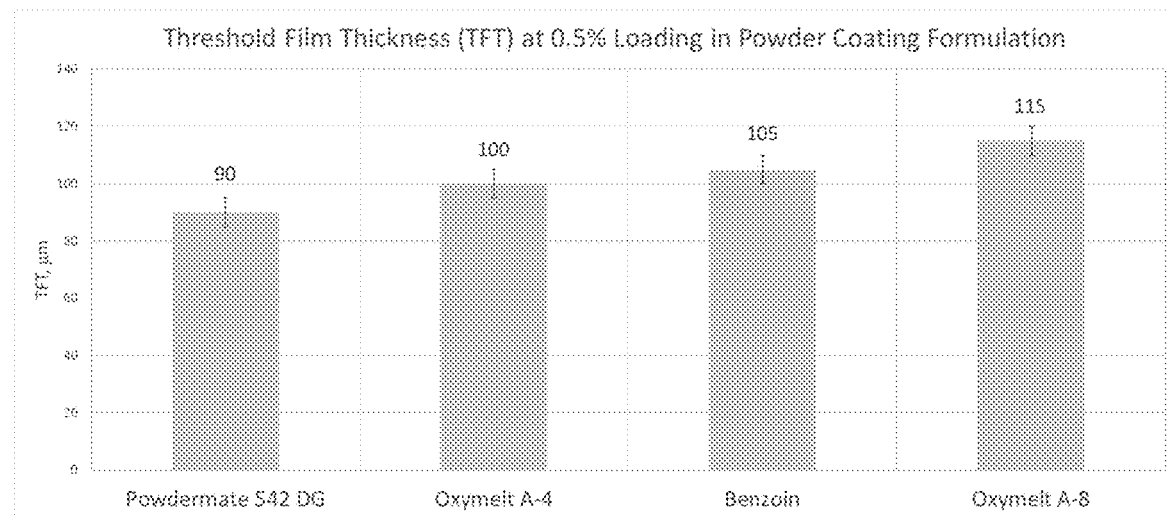
FIG. 1 is a block chart showing Threshold Film Thickness ("TFT") of various degassing agents at 0.5 weight percent of powder coating formulations.

FIG. 1 illustrates Threshold Film Thickness ("TFT") of various degassing agents, including a preferred embodiment of the present invention identified by the trade name Oxymelt A-8, previous to pinhole detection in sample powder coating formulations.

Figure 4:
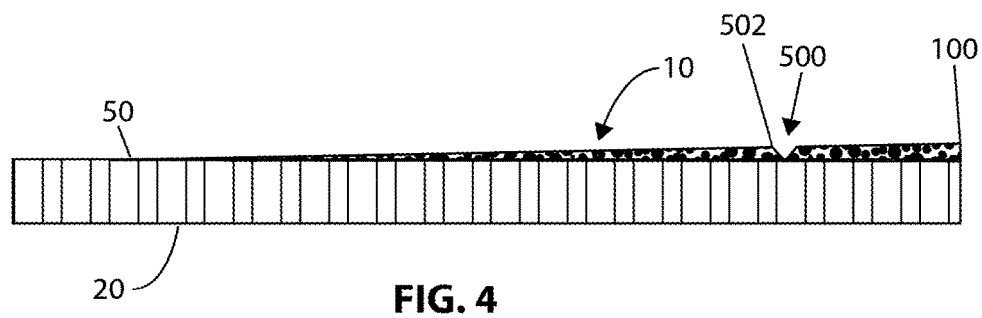
FIG. 4 is a side elevation, diagrammatic view exemplifying a method of Threshold Pinhole Detection to measure the Threshold Film Thickness of various degassing additives.

Individual degassing agents Powdermate 542 DG, Oxymelt A-4, Benzoin, and Oxymelt A-8, were added to individual samples of like powder coating formulations at 0.5 weight percent. As best shown in FIG. 4, samples were then sprayed to 4"×12" panels 20 along a thickness gradient, from a minimum thickness 50 to a maximum thickness 100 to form a wedge 10.

Each panel 20 was subsequently oven-cured at 180° C. for 10 minutes. The precise location upon the wedge 10 where pinholes 500 first appeared was noted for each sample and measured with a digital caliper. The thickness of the wedge 10 immediately preceding the location where pinholes 500 first formed is known as the Threshold Film Thickness ("TFT") corresponding to 100% degassing efficacy at a corresponding thickness of the wedge 10, denoted by reference character 502 in FIG. 4. The greater the TFT for a particular sample, the greater the efficacy of the particular degassing agent. As a reference thickness, paint is typically applied to a surface at a nominal thickness of 60-80 μm. The tolerance of the experiment performed is taken to be within +/−5 μm.

As shown in FIG. 1, Powdermate 542 DG exhibited a TFT of 90 μm; at thicknesses greater than 90 μm pin-holing occurred and the efficacy of Powdermate 542 DG as a degassing agent thereafter failed. Oxymelt A-4, another proprietary formulation of the instant assignee of the present inventive disclosure, remained effective as a degassing agent up to 100 μm. Benzoin, used as a degassing agent by itself in many formulations known in the art, presented a TFT of 105 μm. Oxymelt A-8, the preferred embodiment set forth herein, attained a TFT of 115 μm, exhibiting degassing efficacy at least as effective as pure benzoin (comparable TFT within the error rate 11% of the time), but likely exceeding benzoin (comparable TFT above benzoin outside the error rate 89% of the time). The advantages of the preferred embodiment over pure benzoin include less yellow color change exhibited in the samples (see FIG. 3, discussed below). Thus, even where Oxymelt A-8 performs as efficaciously as a degassing agent comparable to pure benzoin, it nonetheless presents a useful improvement thereof—by minimizing the amount of benzoin used, less color change (yellowing or other discoloration) results. Nonetheless, the increased probability of Oxymelt A-8's TFT outperforming benzoin beyond the error rate over the average should not be discounted.

Figure 2:
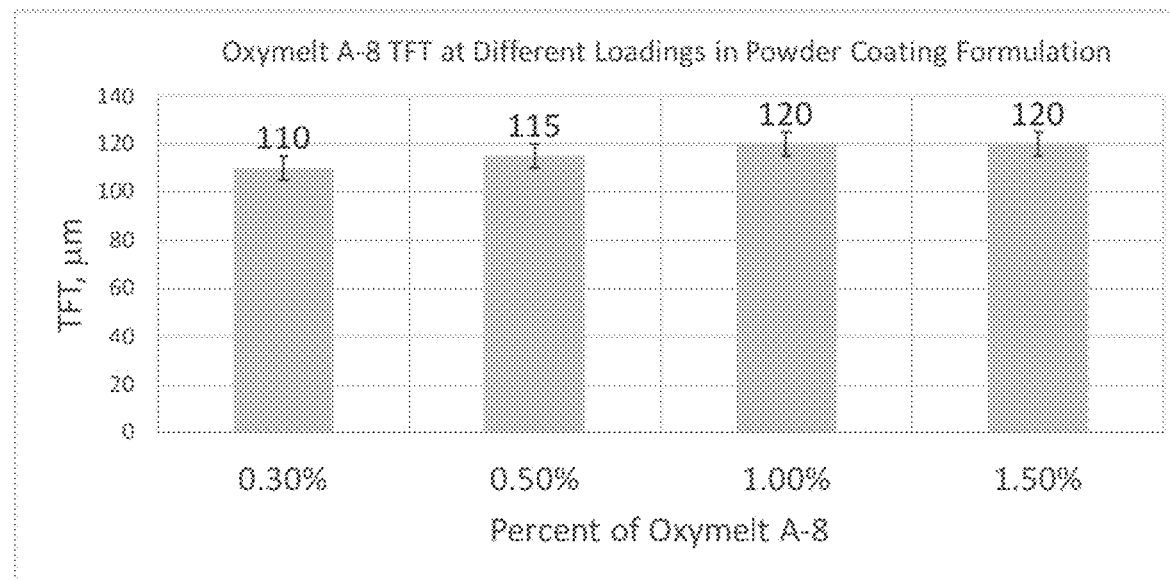
FIG. 2 is a block chart showing the TFT of a preferred embodiment of the present invention, known by the trade name "Oxymelt A-8", measured at different loadings in power coating formulations.

FIG. 2 illustrates the results of TFT measurements for the preferred embodiment Oxymelt A-8 at different weight percentage additions to like powder coating formulations. At 0.3 weight percent loading, Oxymelt A-8 yielded a TFT of 110 μm. At 0.5 weight percent, Oxymelt A-8 yielded a TFT of 115 μm. At 1 and 1.5 weight percentages, Oxymelt A-8 yielded TFTs of 120 μm. The recommended loading of Oxymelt A-8 to powder coating formulations is 0.5 weight percent.

FIG. 3 illustrates data for b* (blue to yellow) values generated as part of the International Commission on Illumination's CIELab color scale as measured with a spectrophotometer. The lower the number, the less yellowing recorded.

Powder formulations containing 1 weight percent degassing agents were spread onto 4"×6"×0.032" cold-rolled steel panels and cured at 180° C. for 10 minutes. Color of each sample was then measured with a spectrophotometer and the b* value recorded for each sample shown. A degree of yellowing off-white from the original sample was therefore determinable.

The spectrophotometric results show that benzoin yielded a b* vale of 2.14. Oxymelt A-4 yielded a b* value of 1.53. Powdermate 542 DG yielded a b* value of 0.86. Oxymelt A-8, the preferred embodiment set forth herein, yielded a b* value of only 0.63, more than three times less than benzoin.

What is claimed is:

1. An isosorbide-based degassing agent comprising:
   15 to 35 weight percent isosorbide;
   60 to 80 weight percent vegetable oil and/or wax;
   0 to 5 weight percent high surface area, inorganic powder; and
   0 to 10 weight percent benzoin;
   wherein the said degassing agent reduces incidences of pinholing during cure.

2. The isosorbide-based degassing agent of claim 1 wherein the high surface area inorganic powder is silica.

3. The isosorbide-based degassing agent of claim 2 wherein the vegetable oil and/or wax is castor oil and/or wax.

4. An isosorbide-based degassing agent comprising:
   15 to 35 weight percent isosorbide;
   60 to 80 weight percent vegetable oil and/or wax; and
   0 to 10 weight percent high surface area inorganic powder;
   wherein the said degassing agent reduces incidences of pinholing during cure.

5. The isosorbide-based degassing agent of claim 4 wherein the high surface area inorganic powder is silica.

6. The isosorbide-based degassing agent of claim 5 wherein the vegetable oil and/or wax is castor oil and/or wax.

7. An isosorbide-based degassing agent comprising:
   28.5 weight percent 1,4,3,6-dianhydro-D-glucitol;
   68.5 weight percent castor oil and/or wax; and at least one selected from
   3 weight percent silica; and
   3 weight percent 2-hydroxy-1,2-diphenyl ethenone
   wherein the said degassing agent reduces incidences of pinholing during cure.

* * * * *